May 21, 1963 H. LOHEST 3,090,879
VARIABLE SPEED MOTOR FOR WINDING APPARATUS
Filed March 22, 1956

INVENTOR:—
HANS LOHEST
BY:—
Marzall, Johnston, Cook & Root
ATT'YS

United States Patent Office 3,090,879
Patented May 21, 1963

3,090,879
VARIABLE SPEED MOTOR FOR WINDING
APPARATUS
Hans Lohest, Remscheid-Lennep, Germany, assignor to Barmer Maschinenfabrik Aktiengesellschaft, Wuppertal-Oberbarmen, Germany
Filed Mar. 22, 1956, Ser. No. 573,264
Claims priority, application Germany Mar. 31, 1955
8 Claims. (Cl. 310—209)

The present invention relates in general to the winding and reeling of flexible material, and has more particular reference to the tension regulated winding of thread or like filamentary material upon tubes, spools, mandrels, reels, bobbins and similar filament receivers.

An important object of the present invention is to provide for the control of filament winding operations in such fashion as to automatically adjust the speed of a winding receiver in accordance with the delivery rate at which filamentary material is supplied thereto, so that the material may be wound upon the receiver under desired tension.

Heretofore many attempts have been made to control the rotation of filament winding mechanism in fashion to maintain the filament under desired tension as it is being applied to a winding receiver, even when the diameter of material wound on the receiver progressively changes during the winding operation. In this connection, it has heretofore been proposed to utilize an electric motor to turn a filament winding receiver, and to control such motor in accordance with changes in thread tension by regulating the speed of the motor through relative axial displacement of the armature and magnetic field components of the motor. It has been found, however, that only relatively small changes in motor speed can be obtained in conventional motors in response to relatively large displacement of the motor components, so that only a relatively flat curve characteristic can be obtained in a regulation diagram.

An important object of the present invention is to overcome the foregoing flat curve response characteristic by separating the circumferentially spaced field poles of the motor each into a plurality of magnetic paths in side-by-side relationship and spaced apart in the direction of the axis of rotation of the motor. To this end, in accordance with the present invention, the several circumferentially spaced field poles of the motor may each be formed as a plurality of axially spaced magnetic sections separated each from the other by air spaces or other magnetic insulation, said sections being in position to cooperate with a corresponding number of magnetic armature portions similarly spaced axially in the motor structure.

As a result of the subdivision of the field pole structure of the motor into several axially spaced sections acting in parallel, side-by-side relationship, the magnetic force or flux, during axial displacement of the field component with respect to the armature component, is simultaneously affected by every section to a corresponding extent. Changes in motor speed, in response to relative axial adjustment of the armature and field components of the motor, take place more quickly and more intensively than is the case in conventional motors. In other words, smaller relative displacement of motor components is required for the accomplishment of a desired amount of regulation.

Another important object of the invention is to form, as leakage fields, the spaces provided between the axially spaced magnetic conduction paths of the armature of the motor, in order to obtain desired regulation characteristics in the motor; a further object being to apply magnetic conducting material having selected magnetic reluctance in said spaces to determine the amount of leakage in said fields.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
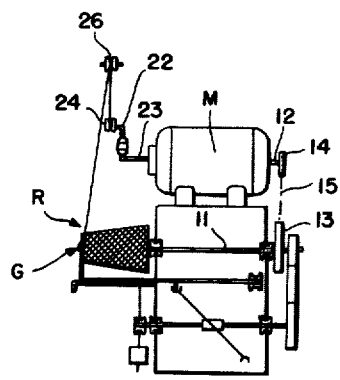
FIG. 1 is a schematic diagram of filament winding apparatus, including a controllable motor for driving the same, said motor embodying the features of the present invention.
Figure 2:
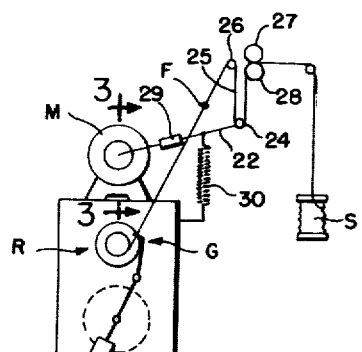
FIG. 2 is a view of the apparatus of FIG. 1, as seen from the left side thereof.

To illustrate the invention, the drawings show a winding device comprising a winding spindle 11 adapted to support and drivingly turn any suitable or preferred winding receiver R, such as a tube, mandrel, spool, reel or bobbin. Conventional bearing means of any suitable or preferred character may be employed for supporting the shaft for turning movement. In accordance with the present invention, filamentary material F, such as thread, may be delivered from a supply source, such as a reel S, through a thread guide G for winding upon the receiver R as the same is turned on and by the spindle 11. The winding spindle 11 is drivingly connected with the shaft 12 of a variable speed electric motor M, as by means of gears 13 and 14 on the shafts 11 and 12 drivingly connected by a chain 15, or other suitable driving means.

The motor M of the present invention may comprise an armature A supported on the shaft 12, and a main frame 16 formed to provide support for the field windings W and the associated circumferentially spaced pole pieces P of the motor, said frame being also formed to provide support for suitable bearings B in which the shaft 12 is mounted for turning movement with respect to the frame, the windings W and the pole pieces P supported thereon, the shaft 12 being thus supported for rotary movement about an axis concentric with respect to the field windings and pole pieces, which may be mounted and secured on the frame 16 in any suitable, preferred or conventional fashion. The circumferentially spaced pole pieces P, however, in accordance with the present invention, are each subdivided to form a plurality of pole sections 31 forming parallel magnetic field conduction paths spaced apart in the direction of the axis of the motor, air or other suitable magnetic insulation being disposed in the space 33 between adjacent pole sections.

Figure 3:
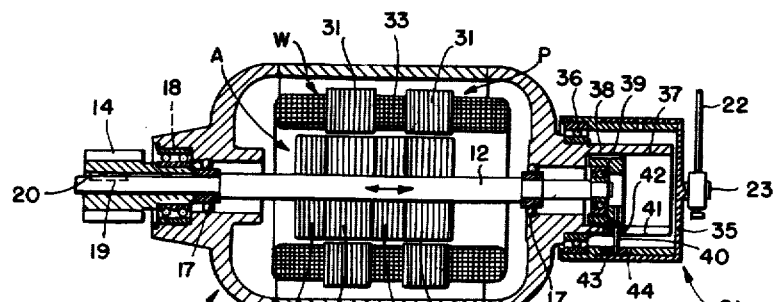
FIG. 3 is a sectional view on an enlarged scale taken substantially along the line 3—3 in FIG. 2.
Figures 4, 5:
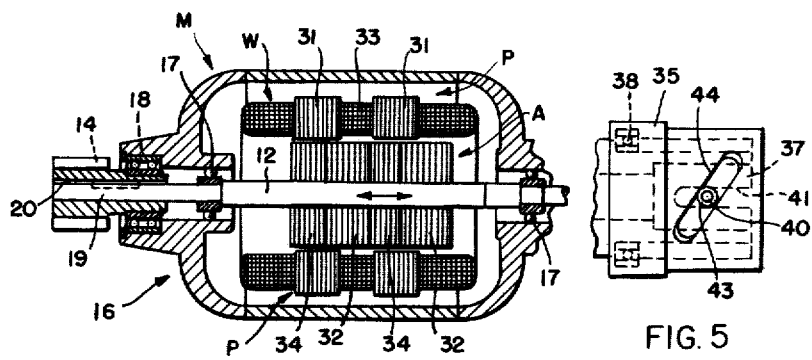
FIG. 4 is a sectional view like FIG. 3, showing the parts in a relatively shifted position.
FIG. 5 is a bottom view illustrating a portion of the device shown in FIG. 3.

The armature is provided with axially spaced magnetic sections 32 corresponding with the field pole sections 31, said sections 32 being secured on the shaft 12 in position to register with the corresponding pole sections 31 when the shaft is in a particular position of axial adjustment, such as the axially adjusted position shown in FIG. 3, between the spaced magnetic sections 32 of the armature and outwardly of a said section. At one end of the armature, may be mounted auxiliary magnetic leakage field armature portions 34 comprising magnetic material having selected reluctance characteristics in order to provide flux leakage fields in the armature between and alongside of magnetic conducting paths formed by the sections 32. These auxiliary armature portions 34 will be disposed in offset relation with respect to the field pole sections 31, when the shaft is in the axially adjusted position illustrated in FIG. 1, but may be disposed in substantial alinement with respect to the field pole sections 31, when the shaft 12 is moved to the shifted position shown in FIG. 4. If, for instance, the armature A be disposed in the relatively shifted position shown in FIG. 3, the motor will operate at maximum speed, motor speed being progressively reduced toward a minimum as the shaft and armature are shifted toward the position shown in FIG. 4.

In order to allow the armature and its supporting shaft to be shifted axially, the shaft may be journaled in the frame 16 by means of suitable bearings 17 of a sort permitting the shaft and armature to rotate freely with respect to the frame 16, and also to be shifted axially within limits. In this connection, the gear 14 may be rotatably supported on the frame 16 by means of suitable roller bearings 18 which turnably support the driving gear 14 against relative axial movement with respect to the frame 16.

The shaft 12 may have an end extending within and drivingly connected with the gear 14, as by means of a spline 19 on the shaft in position extending in a groove 20 on the gear, thereby allowing relative axial sliding movement of the shaft 12 with respect to the driven gear 14.

Operable means 21 is provided for adjusting the relative axial position of the armature with respect to the field windings and poles of the motor in response to fluctuations in the delivery rate of filamentary material to the winding mechanism, in order to maintain desired tension in the material as it is applied on the winding receiver. To this end, axial adjustment of the shaft 12 may be effected under the control of a thread feeler member 22, preferably comprising a lever pivoted for rocking movement about a fulcrum axis 23 and carrying a filament guide, such as a roller 24, on the lever remote from the fulcrum. By means of the roller 24, the lever 22 may be supported upon a bight 25 formed in the filament as between a roller 26 and a pair of delivery rollers 27 and 28 which are preferably driven at substantially constant speed for drawing filament from the supply reel S and delivering the same around the rollers 24 and 26, in position to be wound upon the receiver R.

Suitable means may be provided for biasing the lever in a direction on its fulcrum 23 to determine winding tension applied upon the filament, at the bight 25, by the roller 24. Such biasing means, if desired, may comprise a weight 29 which may be adjustable longitudinally of the lever between the fulcrum 23 and the roller 24, or a biasing spring 30, which may also be adjustable, if desired, or both a weight and spring may be employed to obtain desired winding tension in the filament.

Any disparity between the rate at which the filament F is delivered from the storage reel by operation of the rollers 27 and 28, and the winding speed at the receiver R, will result in movement of the lever 22 about the axis of its fulcrum in one direction or another, as determined by the length of filament comprising the bight 25. The lever 22 is thus capable of sensing such disparity and of correspondingly adjusting the axial position of the shaft to appropriately alter the speed of the motor M in order to offset or correct the sensed disparity by appropriately changing the driven speed of the filament receiver.

To this end, the arm 22 may be drivingly connected with a cam drum structure 35 journaled on the motor frame 16, as by means of a suitable roller bearing 36 for rocking movement about the axis of the shaft 12, said cam drum structure encircling a sleeve-like portion 37 of the motor frame 16, which extension is concentric with respect to the shaft 12, and is disposed at the end of the motor frame remote from the gear 14. The extension 37 is sized to slidably receive a support member 38 of ring-like configuration carrying a roller bearing 39 by means of which an end of the shaft 12 is turnably secured in fashion preventing relative axial movement of the shaft with respect to the ring 38.

The ring 38 carries a cam engaging pin 40 extending radially outwardly thereof through a slot 41 formed in the extension sleeve and extending in a direction parallel with respect to the shaft 12. The cam pin may be and preferably is fitted with a roller 42 for engagement in the groove 41. The pin 40 also includes an end portion remote from the ring-like support member 38, and provided with a roller 43 adapted to extend within and engage a helically inclined slot 44 formed in the drum structure 35. As a consequence of the foregoing structure, the shaft 12 and the shaft carried armature A may be adjusted in the frame 16 in either direction axially of the shaft in response to rocking movement of the drum 35 about the axis of the shaft in one direction or the other, such rocking movement being caused by the movement of the lever in response to the combined action thereon of the filament at the bight 25 and the biasing means comprising the weight 29, or spring 30, or both.

The filament feeler arm 22 always adapts itself to the length of filamentary material that is disposed between the supply bobbin S and the winding receiver R, so that the filamentary material may be delivered under such tension as is applied thereto by the action of the biased lever upon the filamentary material at the bight 25. Any variation in the differential between the rate of supply of filamentary material, through the feed rollers 27 and 28, and the rate at which the receiver, at its driven speed, accepts the filamentary material, will be sensed by the arm 22 and immediately applied through the drum 35 to thus alter the speed of the receiver driving motor in fashion to offset or adjust the so sensed variation, and thus maintain desired tension in the filament. For example, should the rate of filament delivery decrease, or the winding speed of the filament on the receiver increase, as when the winding diameter of the filament on the receiver is increased without reduction in rotary speed of the receiver, the bight 25, upon which the feeler arm 22 is suspended, will become shortened, thereby turning the arm 22 and the drum 35 in a direction to axially shift the shaft 22 in fashion decreasing motor speed sufficiently to equalize the filament winding speed of the receiver with the rate of delivery of the filamentary material through the rollers 27 and 28.

The thread guide G may be of suitable, preferred or conventional form, and any suitable or preferred guide actuating mechanism may be provided for causing the same to travel back and forth in front of the winding receiver R to guide the filamentary material F upon the receiver in a desired pattern during the winding operation. The arrangement of the winding device serves to regulate the rotation of the winding receiver, the filament winding speed, and consequently the quantity and length of filamentary material wound on the receiver. The device is designed to regulate, in desired fashion, the tension of the thread as applied upon the receiver. Since the thrust, applied by the feeler arm applied on the filament, can be adjusted to a desired value by means of the weight 29 or the spring 30, any variation in the rate of supply of the filamentary material may be deducted immediately by the feeler arm, which automatically functions to bring and maintain the motor at the required receiver driving speed to maintain a desired tension in the filament, regardless of the variations in the rate of delivery thereof from the supply source, or changes in the winding speed of the receiver, as by variation in filament winding diameter thereon during the winding operation.

An important advantage of the herein disclosed arrangement is that variations in the filament delivery and winding rates do not act directly upon the winding receiver, but are applied through the arm 22 to adjust motor speed so that the formation of the wound filament structure proceeds uniformly and without tensional or other disturbances. A particular advantage of the foregoing arrangement which produces a multiple driving force flux change in the armature for the purpose of regulating motor speed, is the appreciable steepness of the regulation groove, that is to say, relatively small shaft movement produces relatively large change in motor speed, within limit; and furthermore, such relatively large change in motor speed is accomplished at the expense of minimal displacement energies substantially without change in filament tension.

While it is preferable to form the field pole system of the motor as an electromagnetic structure embodying the pole piece sections 31 and the field windings W, it will be obvious that the field pole system may comprise permanent magnets without windings. Furthermore, when predetermined maximum or minimum values of motor tension are exceeded, or in the event of filament breakage, conventional switching means may be employed to disable the motor; and such switching means may be drivingly connected with the arm 22, for actuation thereby under the circumstances mentioned.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the forms herein disclosed being a preferred embodiment for the purpose of illustrating the invention.

The invention is hereby claimed as follows:

1. A variable speed motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, and means to adjust the relative axial relationship of said components.

2. A variable speed motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, a field winding commonly linked with said axially spaced pole sections, and means to adjust the relative axial relationship of said components.

3. A variable speed motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, a field winding commonly linked with said axially spaced pole sections, means to adjust the relative axial relationship of said components, said armature component having axially spaced apart magnetic path forming portions, and a magnetic leakage path disposed adjacent each of said path forming portions, said leakage paths being spaced apart a distance substantially equal to the spacement of said path forming portions.

4. A variable speed motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, a field winding commonly linked with said axially spaced pole sections, means operable to shift the armature component axially within and with respect to the field component, to thereby adjust the relative axial relationship of said components, said armature component having axially spaced apart magnetic path forming portions, and a magnetic leakage path disposed adjacent each of said path forming portions, said leakage paths being spaced apart a distance substantially equal to the spacement of said path forming portions.

5. A filament winding device comprising a shaft for turning a filament receiver, a motor drivingly connected with said shaft, said motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, and means to adjust the relative axial relationship of said components.

6. A filament winding device comprising a shaft for turning a filament receiver, a motor drivingly connected with said shaft, said motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, a field winding commonly linked with said axially spaced pole sections, and means to adjust the relative axial relationship of said components.

7. A filament winding device comprising a shaft for turning a filament receiver, a motor drivingly connected with said shaft, said motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, a field winding commonly linked with said axially spaced pole sections, means to adjust the relative axial relationship of said components, said armature component having axially spaced apart magnetic path forming portions, and a magnetic leakage path disposed adjacent each of said path forming portions, said leakage paths being spaced apart a distance substantially equal to the spacement of said path forming portions.

8. A filament winding device comprising a shaft for turning a filament receiver, a motor drivingly connected with said shaft, said motor comprising an armature component having axially spaced apart magnetic path forming portions and a field component providing field poles angularly spaced apart with respect to the rotary axis of the motor, said field poles each comprising sections forming separate magnetic flux paths operatively associated with the armature component of the motor, said sections being spaced apart axially of the motor a distance substantially equal to the spacement of said path forming portions of the armature, a field winding commonly linked with said axially spaced pole sections, means operable to shift the armature component axially within and with respect to the field component, to thereby adjust the relative axial relationship of said components, said armature component having axially spaced apart magnetic path forming portions, and a magnetic leakage path disposed adjacent end of said path forming portions, said leakage paths being spaced apart a distance substantially equal to the spacement of said path forming portions.

References Cited in the file of this patent

UNITED STATES PATENTS

| | | |
|---|---|---|
| 1,522,742 | Parvin | Jan. 13, 1925 |
| 1,557,213 | Lee | Oct. 13, 1925 |
| 1,956,041 | Naul | Apr. 24, 1934 |
| 2,271,049 | Treckmann | Jan. 27, 1942 |

FOREIGN PATENTS

| | | |
|---|---|---|
| 26,902 | France | Dec. 6, 1923 |
| 718,860 | France | Nov. 13, 1931 |
| 691,864 | Germany | June 7, 1940 |
| 874,424 | Germany | Apr. 23, 1953 |

UNITED STATES PATENT OFFICE
CERTIFICATE OF CORRECTION

Patent No. 3,090,879 May 21, 1963

Hans Lohest

It is hereby certified that error appears in the above numbered patent requiring correction and that the said Letters Patent should read as corrected below.

Column 7, line 11, for "end" read -- each --.

Signed and sealed this 7th day of January 1964.

(SEAL)
Attest:

ERNEST W. SWIDER

Attesting Officer

EDWIN L. REYNOLDS

Acting Commissioner of Patents